United States Patent [19]
Kelley et al.

[11] Patent Number: 5,511,349
[45] Date of Patent: Apr. 30, 1996

[54] RACEWAY CABLE RETENTION AND ACCOMMODATION APPARATUS

[75] Inventors: James O. Kelley, Spring Lake; John G. Otto, Grandville, both of Mich.

[73] Assignee: Herman Miller, Inc., Zeeland, Mich.

[21] Appl. No.: 288,150

[22] Filed: Aug. 9, 1994

Related U.S. Application Data

[63] Continuation of Ser. No. 971,335, Nov. 4, 1992, Pat. No. 5,383,318.
[51] Int. Cl.⁶ ............................................ E04B 2/00
[52] U.S. Cl. .................. 52/287.1; 52/220.7; 52/238.1; 52/288.1; 248/49; 248/68.1
[58] Field of Search ................... 52/238.1, 239, 52/292, 287.1, 288.1, 220.7; 248/49, 68.1; 174/48, 49

[56] References Cited

U.S. PATENT DOCUMENTS 5,336,849  8/1994  Whitney ........................... 52/287.1 X

*Primary Examiner*—Philip C. Kannan
*Attorney, Agent, or Firm*—Willian Brinks Hofer Gilson & Lione

[57] ABSTRACT

A raceway cable retention and accommodation apparatus which has a support surface and a bracket. The bracket comprises a mounting portion, a first leg connected to the mounting portion, a second leg connected to the first leg, and a third leg connected to the second leg. The mounting portion and the first, second, and third legs are configured so as to define a J-shaped structure. The bracket is attached to the support surface by a mounting device. A panel for a panel system which has five surfaces. The panel has a first surface, a second surface connected to the first surface, and a third surface connected to the second surface. Furthermore, the panel has a fourth surface connected to the third surface and a fifth surface connected to the fourth surface. The panel is configured such that the first and second surfaces are mirror images of the fourth and fifth surfaces with respect to a plane which is perpendicular to the third surface. In addition, the first surface defines an acute angle with respect to the plane. An improved panel system having a support surface, a C-shaped bracket mounted to the support surface and a cover attached to the C-shaped bracket.

22 Claims, 9 Drawing Sheets

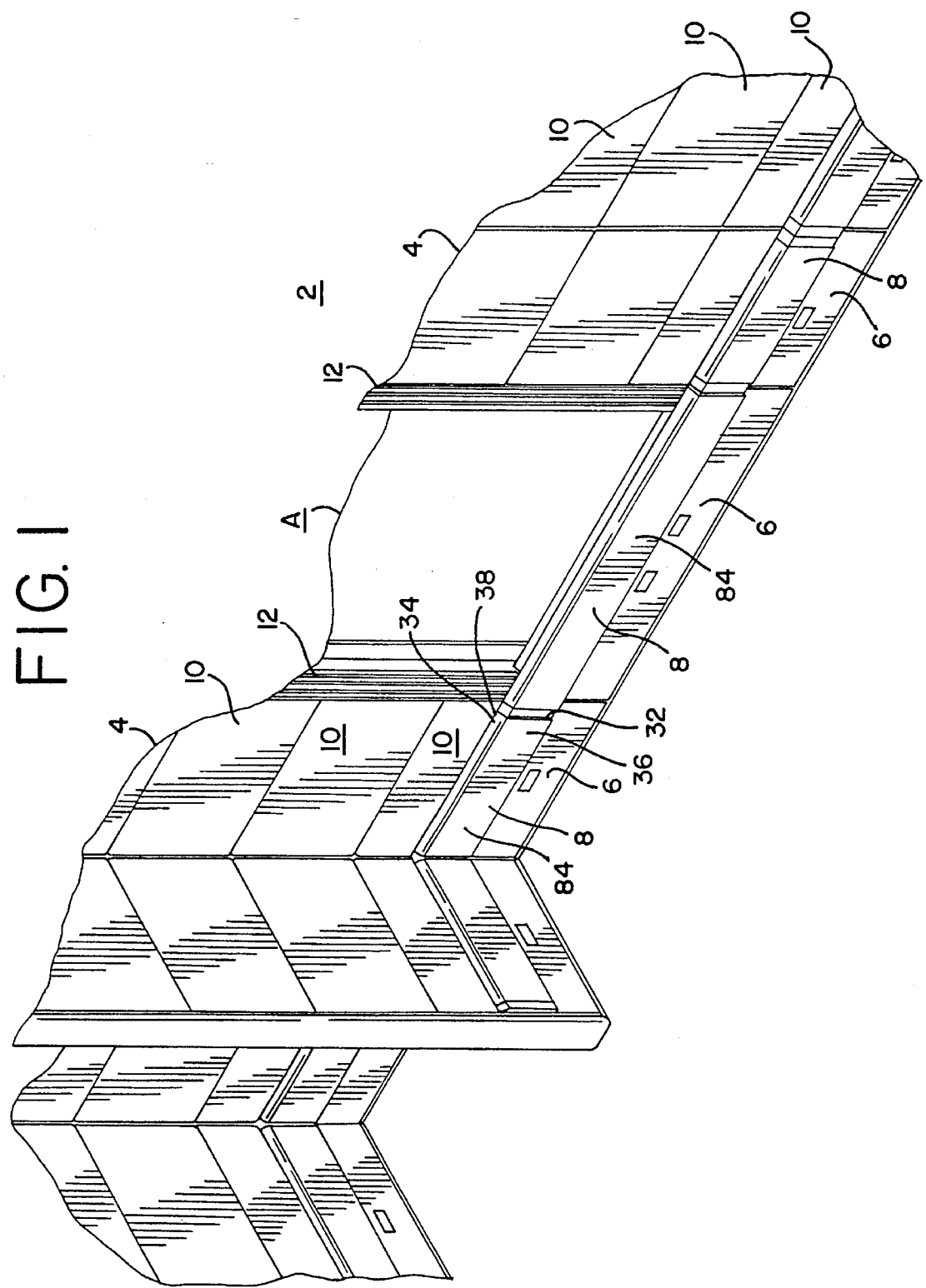

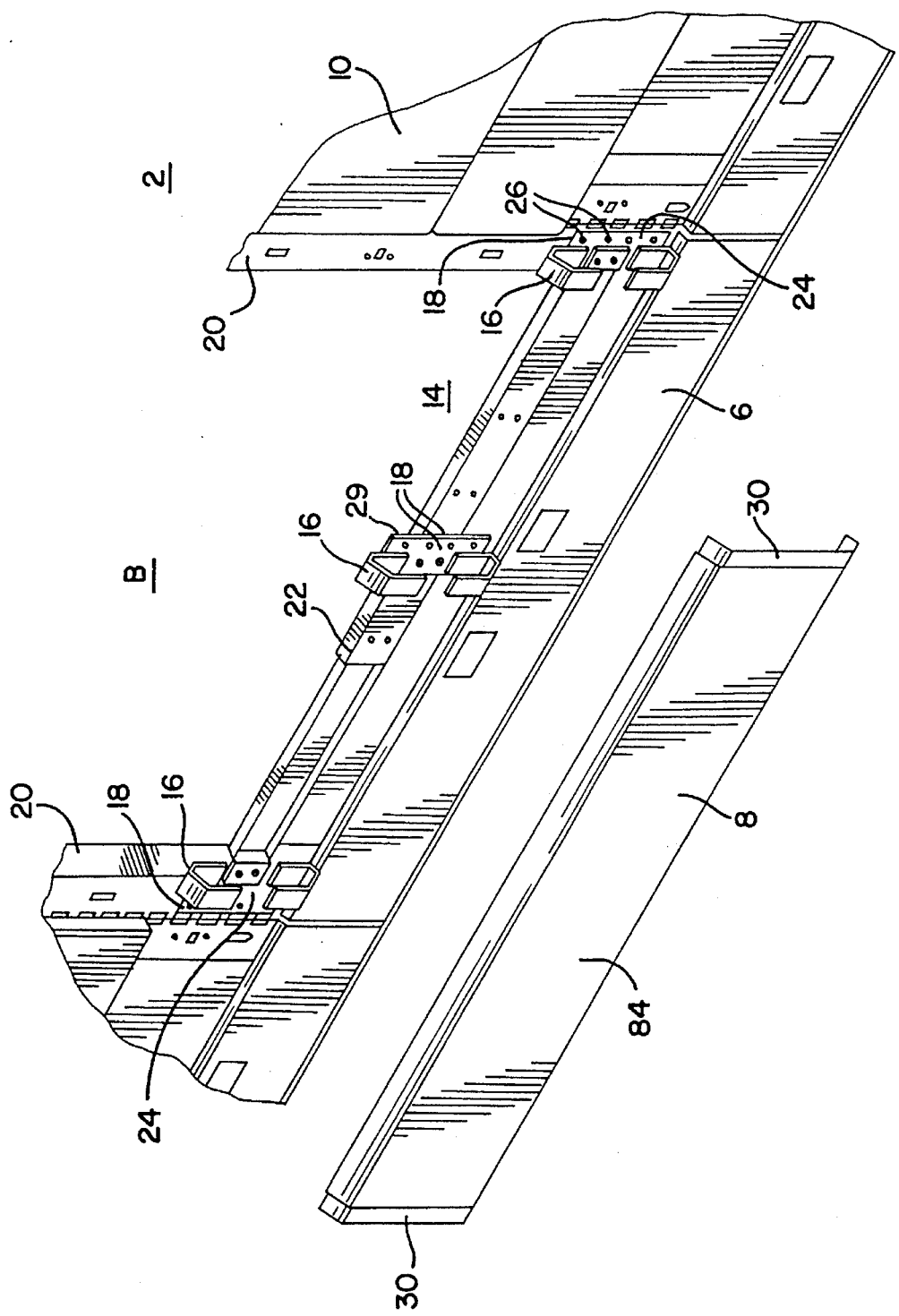

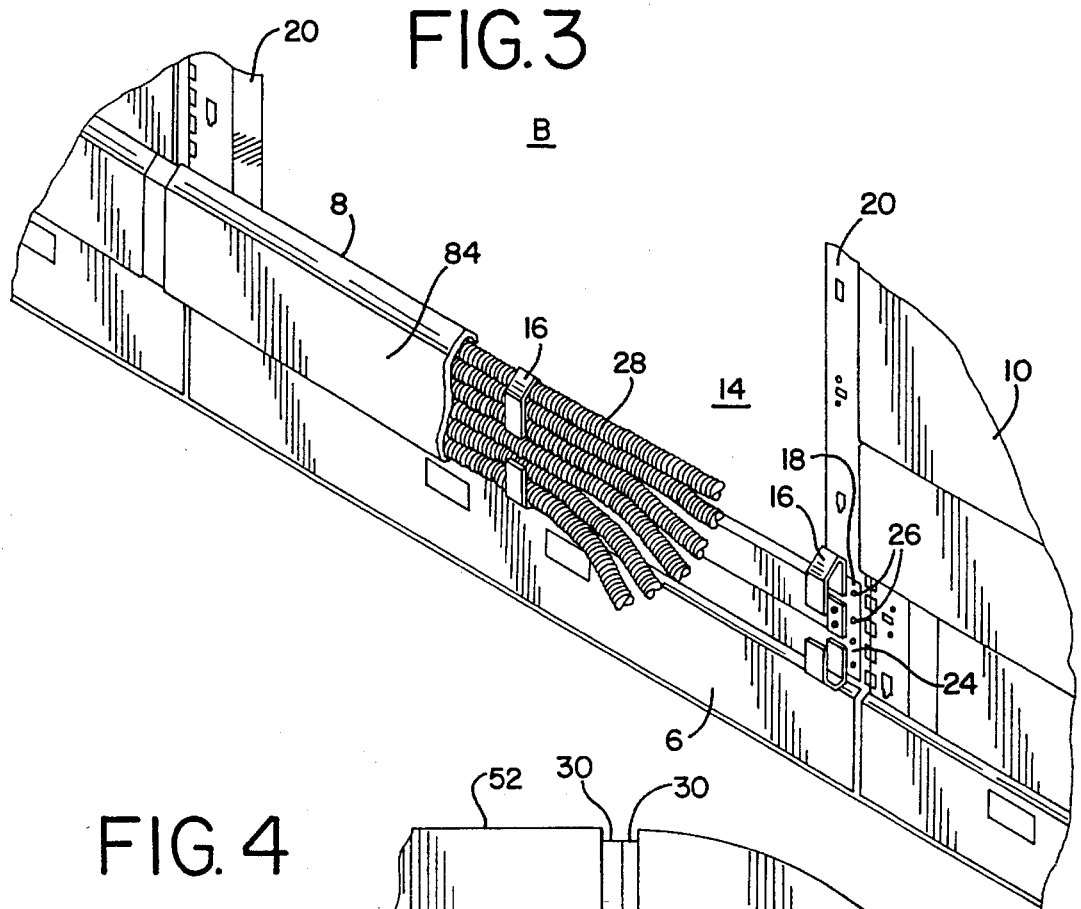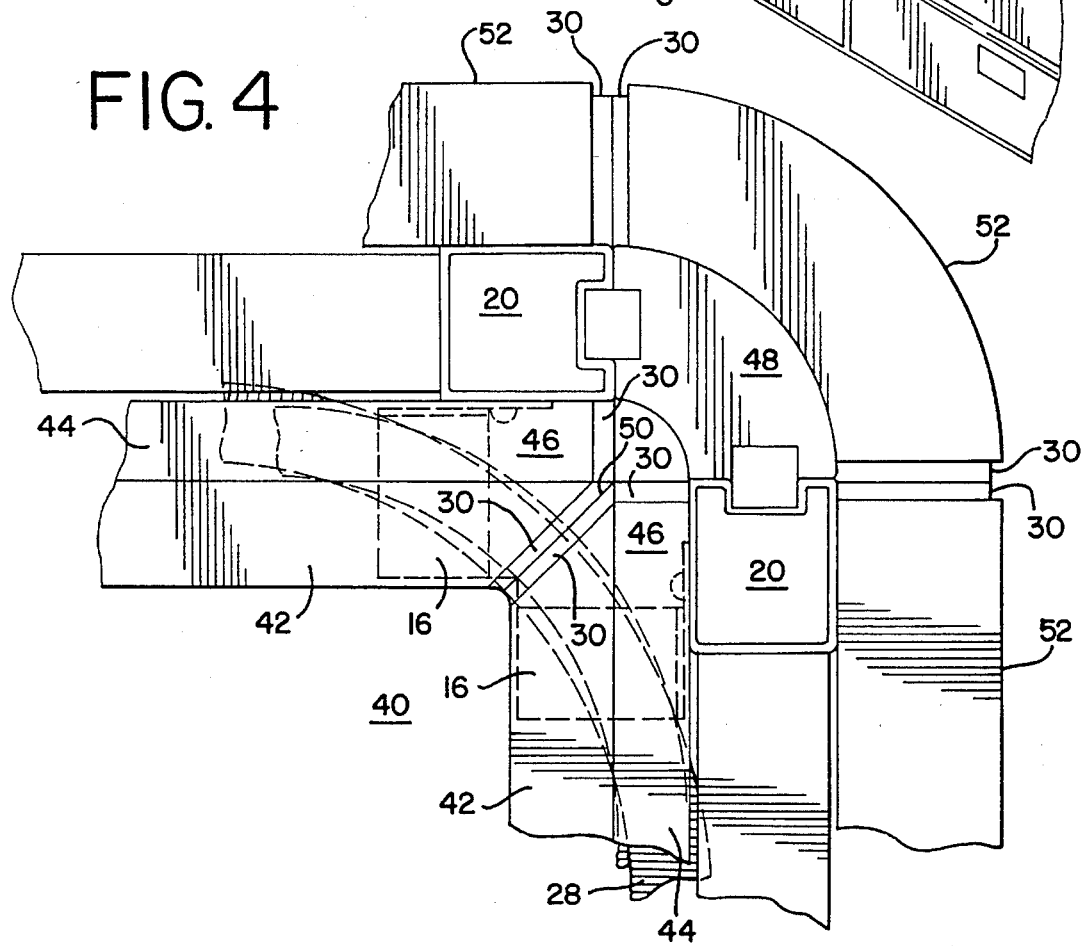

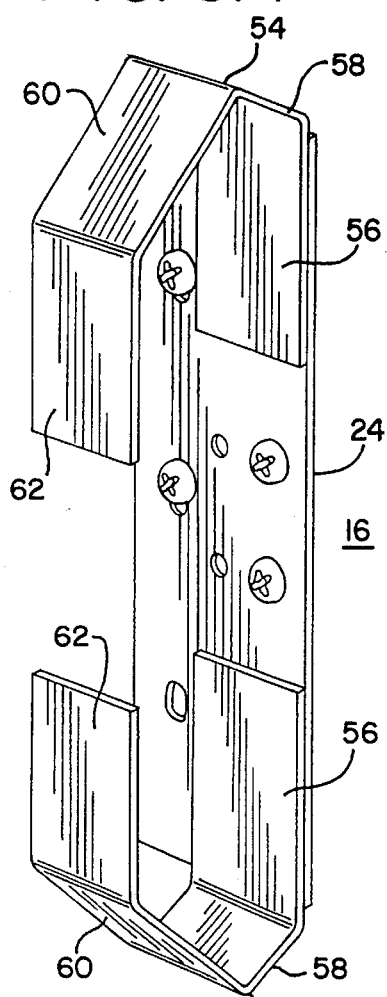
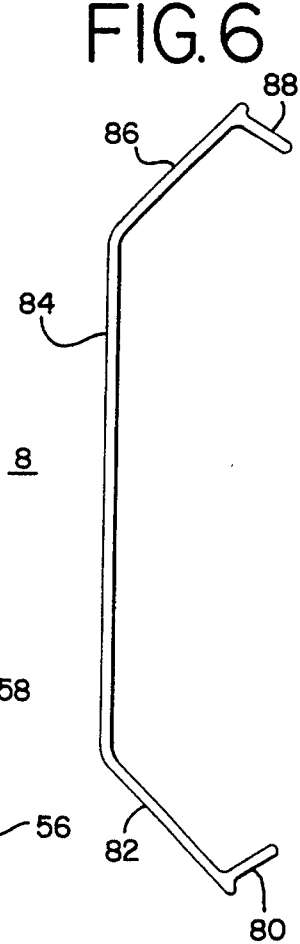
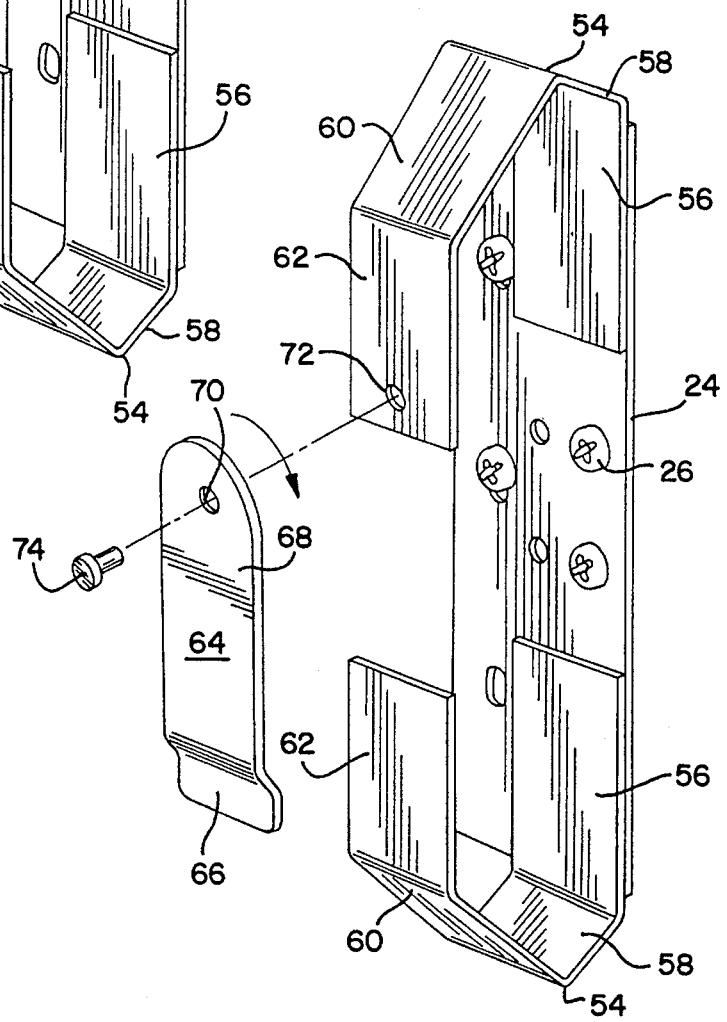

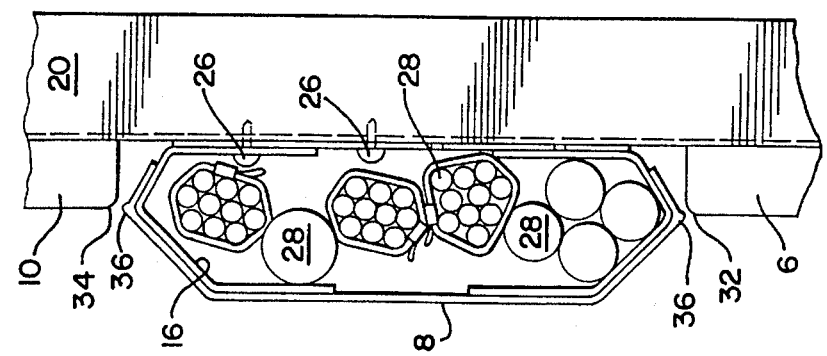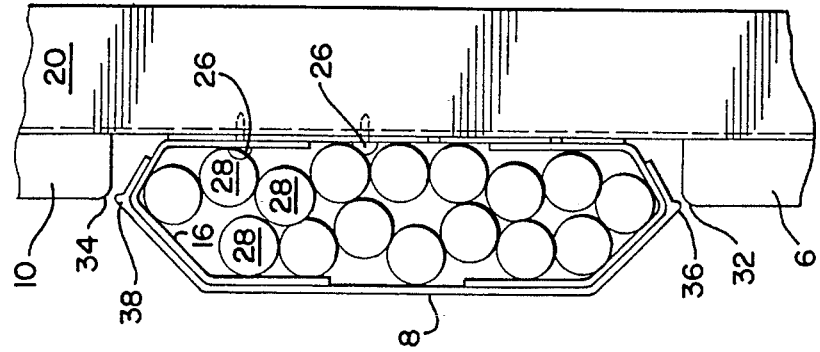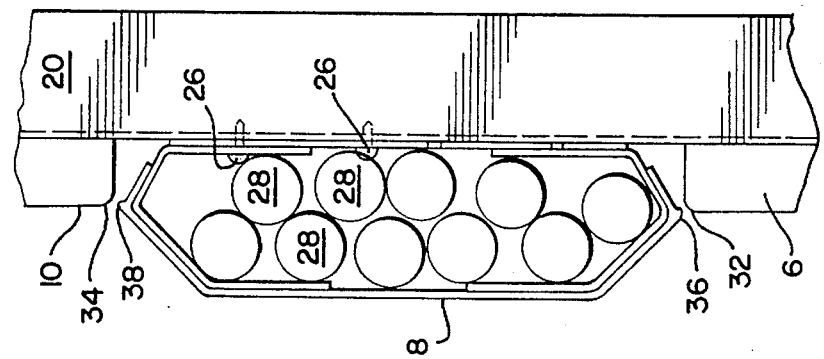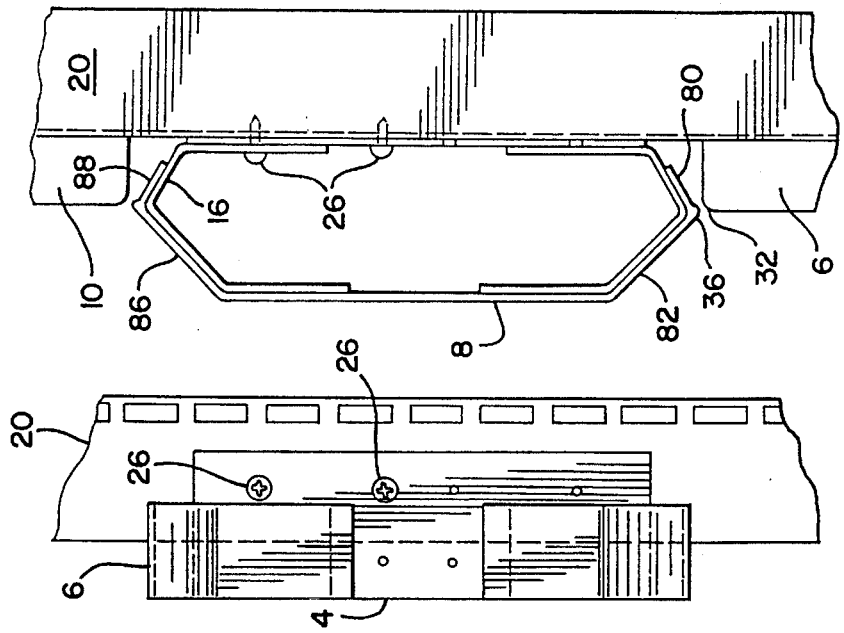

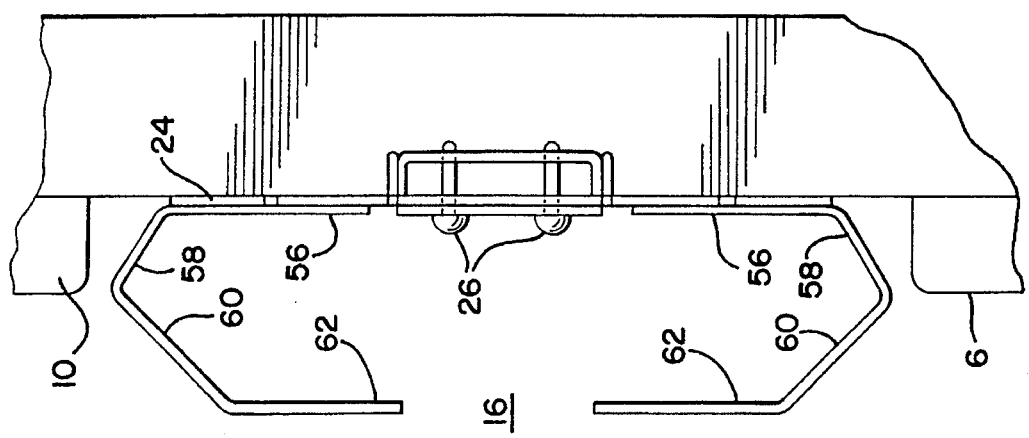
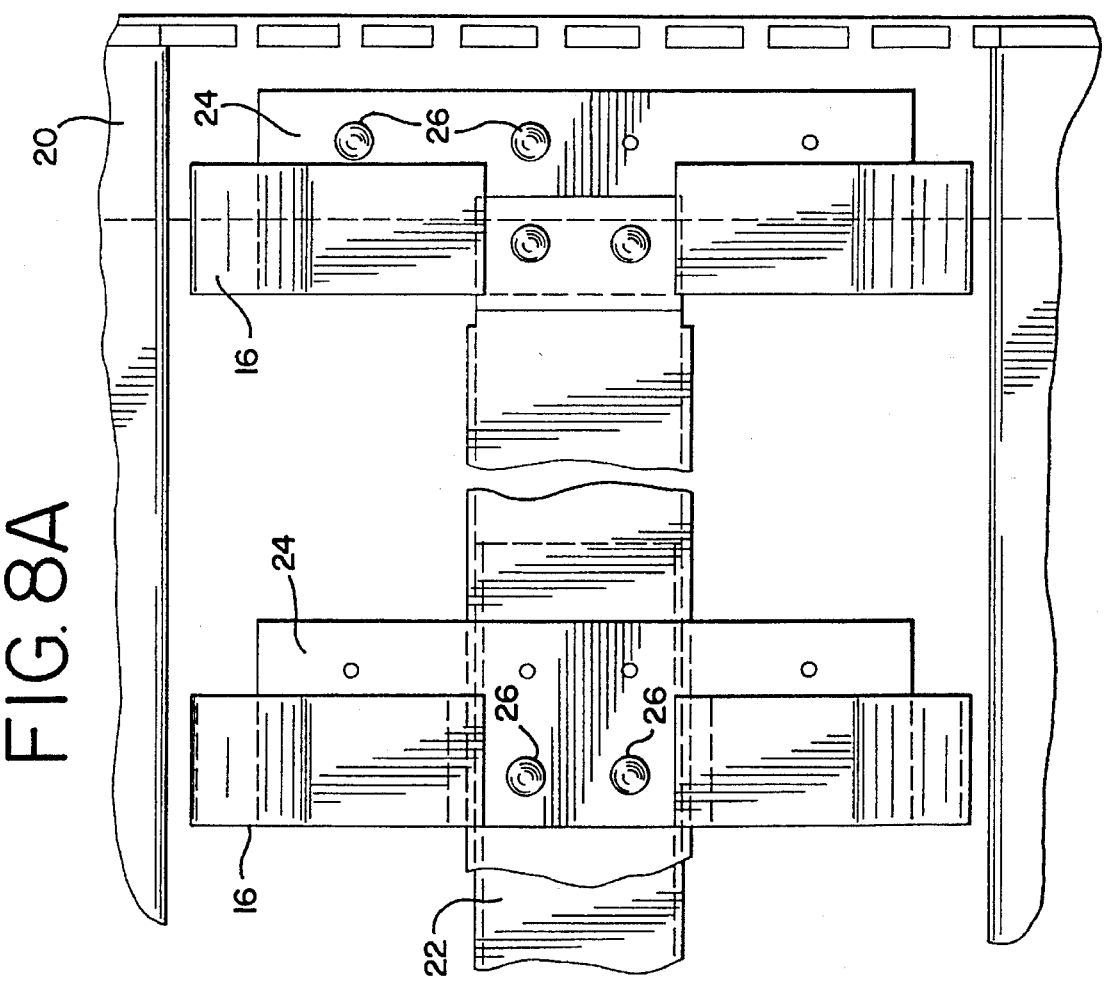

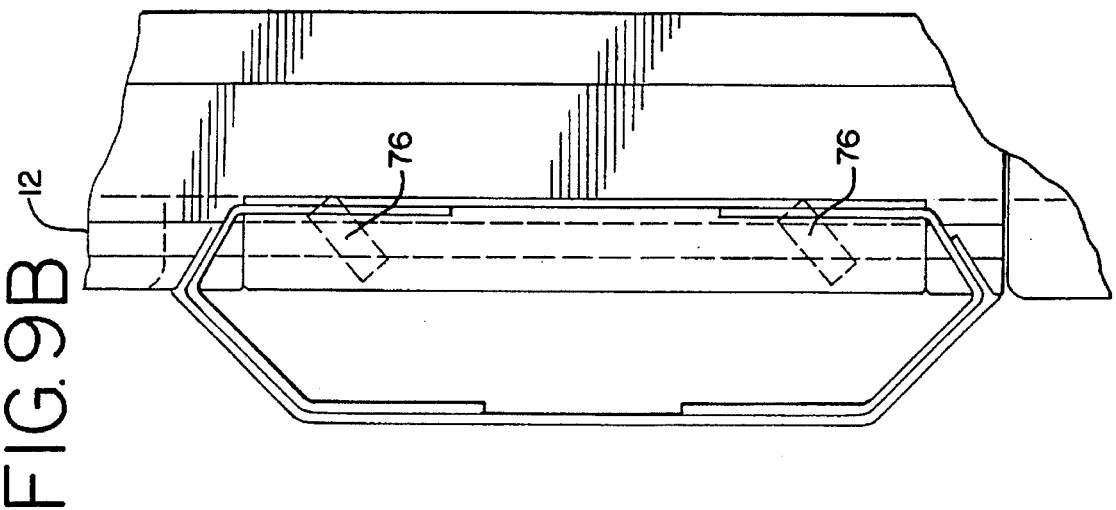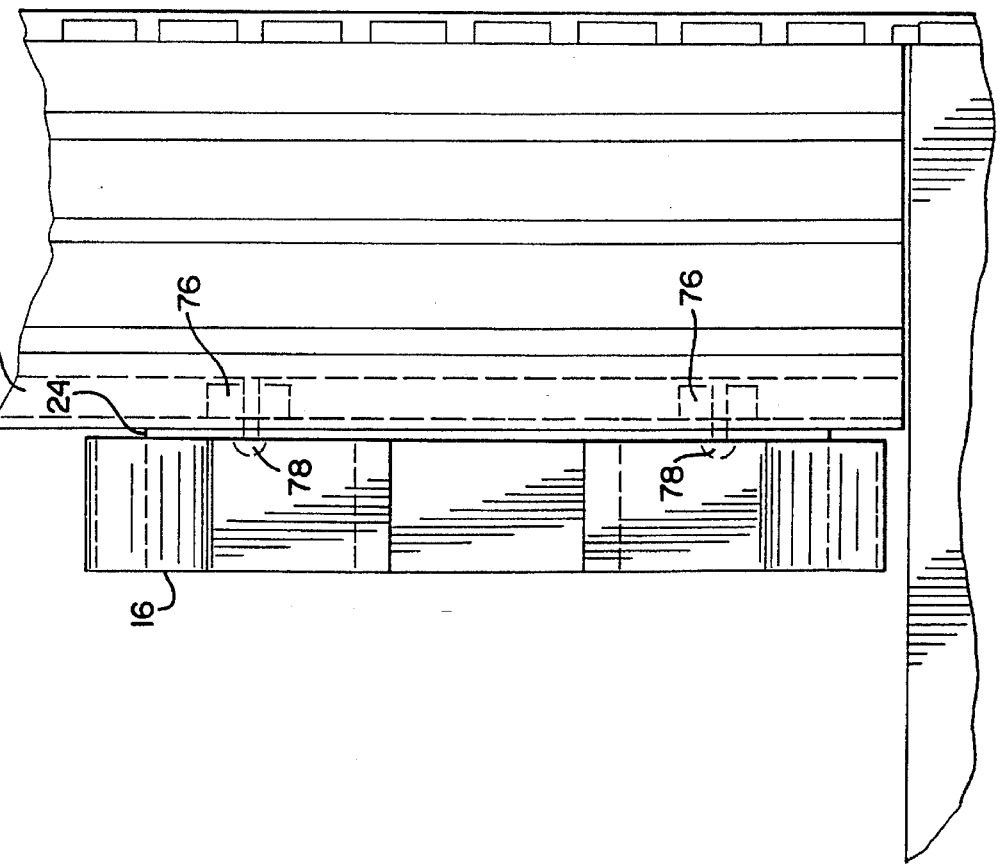

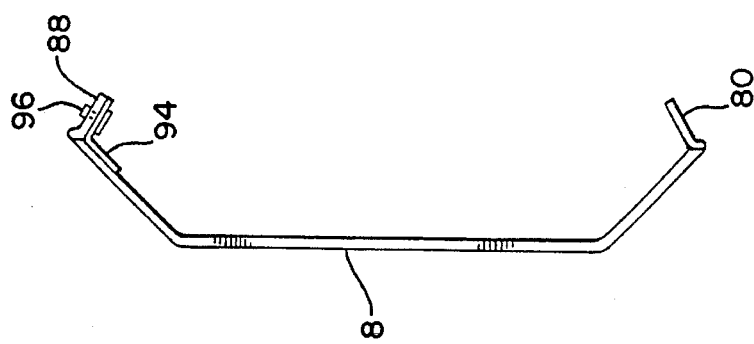
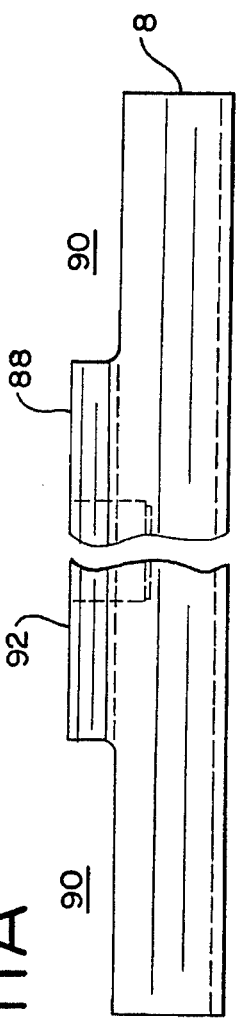
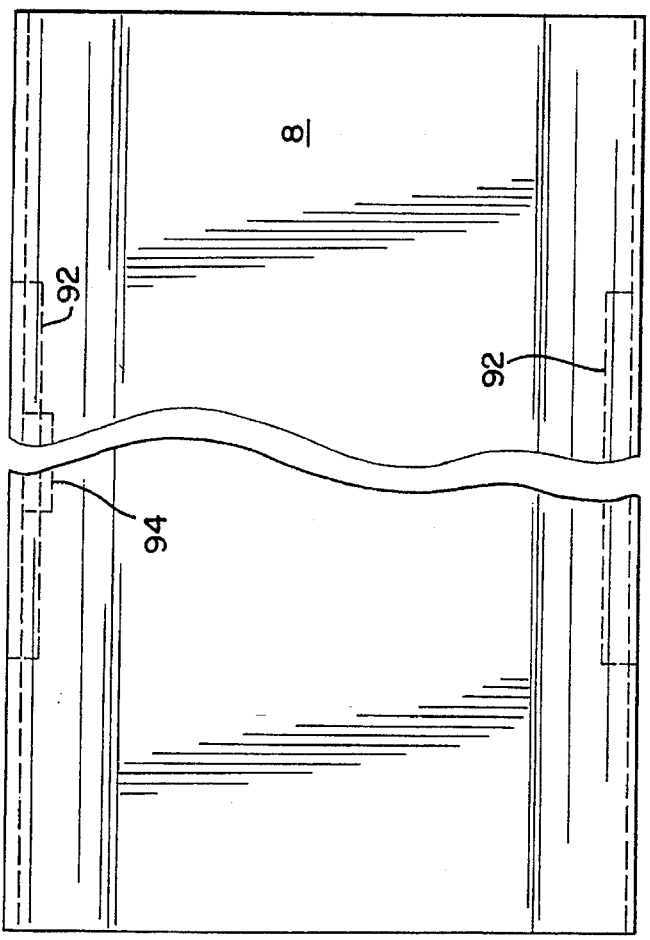

RACEWAY CABLE RETENTION AND ACCOMMODATION APPARATUS

This application is a continuation of application No. 07/971,355, filed Nov. 4, 1992, now U.S. Pat. No. 5,383,318.

FIELD OF THE INVENTION

The present invention relates to a raceway cable retention and accommodation apparatus having the dual functions of providing a support for a panel and providing a support for cables located behind the panel.

BACKGROUND OF THE INVENTION

The present invention is directed to a modular panel system which is easily constructed and allows for easy installation of the wiring necessary in an office or hospital-like environment. It is well known to employ modular wall systems in offices and hospitals to create individual work stations which present a sense of privacy for those working at the station, while at the same time the wall system provides a more open working atmosphere. One essential attribute of any modular wall system is the ability to be positioned in a myriad of different configurations so as to be adaptable to the different functions of the office or hospital and adaptable to various permanent features already present in the office or hospital. An example of such a modular wall system is U.S. Pat. No. 5,038,539, assigned to Herman Miller, Inc.

Modular wall systems were developed in which internal conduits were provided in the walls. In some embodiments, the internal conduits were formed by forming a recess in the wall and attaching brackets inside the recess. The brackets were used to support a panel that formed an exterior part of the modular wall. Wiring and such were then placed in the internal conduit defined by the recess, brackets, and the panel.

One disadvantage of such prior modular wall systems is that they have a limited capacity in the amount of wiring that they can accommodate.

Accordingly, it is an object of the present invention is to provide a modular wall system which provides for increased capacity for wiring present in the modular wall.

Another object of the present invention to provide a simple bracketing system to improve cost and decrease the time of installation of wiring and the panel.

SUMMARY OF THE INVENTION

The above objects are accomplished in the present invention which is directed to a raceway cable retention and accommodation apparatus which has a support surface and a bracket to support a cover. In one embodiment of the invention, the raceway cable retention and accommodation apparatus comprises a cover extending along a first direction. The cover is attached to a C-shaped bracket connected to a support surface.

The above-described raceway cable retention and accommodation apparatus provides a simple bracket which leads to improved attachment of a cover to a modular wall system. Furthermore, the raceway cable retention and accommodation apparatus defines an inner conduit space which provides for improved capacity for retaining cables.

In another aspect of the present invention, a bracket comprises a mounting portion, a first leg connected to the mounting portion, a second leg connected to the first leg, and a third leg connected to the second leg. The mounting portion and the first, second, and third legs are configured so as to define a J-shaped structure. The J-shaped bracket is attached to the support surface by a mounting device.

The above-described mounted bracket allows for improved ease in attaching a cover in a snap-on fashion. The mounted bracket allows for increased cable capacity and allow for "laying-in" cable.

Another aspect of the invention is a panel for a panel system which has five lateral surfaces angled with respect to each other. The panel has a first surface, a second surface connected to the first surface, and a third surface connected to the second surface. Furthermore, the panel has a fourth surface connected to the third surface and a fifth surface connected to the fourth surface. The panel is configured such that the first and second surfaces are mirror images of the fourth and fifth surfaces with respect to a plane which is perpendicular to the third surface. In addition, the first surface defines an acute angle with respect to the plane.

The above-described panel provides for easy snap-on installation to a bracket. The panel also allows for defining an inner conduit which has increased capacity for retaining cables. The panel also has an aesthetically pleasing look.

Another aspect of the present invention is an improved panel system. The improved panel system has a first panel and first and second posts spaced from each other. The first and second posts are connected to each other by a connection piece. A C-shaped bracket is mounted to the connection piece and the panel is attached to the C-shaped bracket.

The above-described panel system provides for improved modification in the configuration of the system in response to customized requirements in the field.

The above-described panel system provides a panel which juts out beyond a plane containing adjoining panels resulting in increased cable capacity and improved ease in positioning cables in the wall when compared with the planar adjoining panels.

The above-described panel system provides for unobstructed horizontal wire and cable routing capability, which is called "laying-in" in the art.

The above-described panel system provides for selectable vertical wire and cable ingress and egress. The panel system also provides logical interface capability with power and signal cable entry from floors, walls and from power poles.

DETAILED DESCRIPTION OF DRAWINGS

FIG. 1 is a view of a panel system employing an embodiment of the present invention;

FIG. 2 is an exploded view of a section of the panel system of FIG. 1;

FIG. 3 is a view of the panel system of FIG. 2 with cables present;

FIG. 4 is a top cross-sectional view of a corner section of the panel system of FIG. 1;

FIG. 5A is a view of a first embodiment of a bracket used in the present invention;

FIG. 5B is a view of a second embodiment of a bracket used in the present invention;

FIG. 6 is a view of an embodiment of a panel used in the present invention;

FIG. 7A is a front view of the bracket of FIG. 5;

FIG. 7B is a side view of the bracket of FIG. 5 with the panel of FIG. 6 attached thereto;

FIGS. 7C–E illustrate the FIG. 7B embodiment of the present invention with various cables contained therein;

FIG. 8A is a front view of a second embodiment of a bracket used in the present invention;

FIG. 8B is a side view of the bracket of FIG. 8A;

FIG. 9A is a front view of a third embodiment of a bracket used in the present invention; and FIG. 9B is a side view of the bracket of FIG. 9A.

Figure 10A:
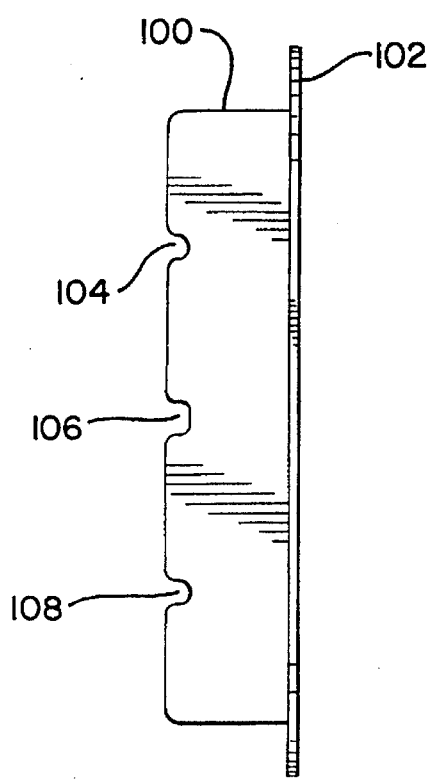
Figure 10B:
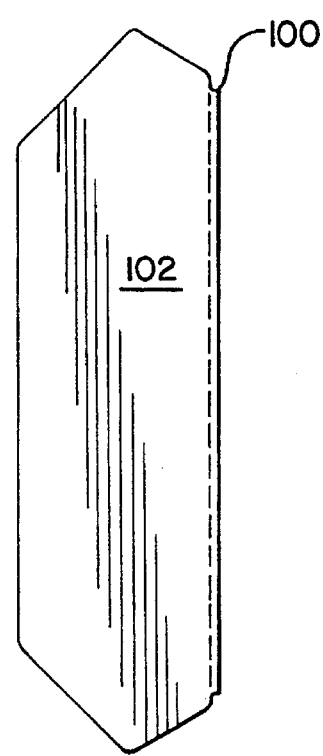

FIG. 10A is a front view of a cap used in the present invention;

FIG. 10B is a side view of the cap of FIG. 10A;

FIG. 11A is a plan view of a second embodiment of a retention panel used in the present invention;

FIG. 11B is a front view of the retention panel of FIG. 11A;

FIG. 11C is a side view of the retention panel of FIG. 11A; and

Figure 12:
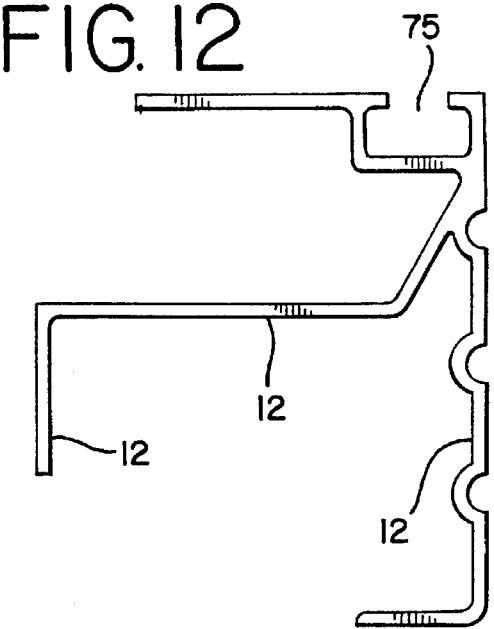

FIG. 12 is a top cross-section view of an extrusion used in the embodiment of FIGS. 1, 9A–9B, and 11A–C.

DETAILED DESCRIPTION OF PREFERRED EMBODIMENT

The present invention is best understood upon viewing a preferred embodiment illustrated in FIGS. 1–3. In FIG. 1 a modular wall panel system 2 is illustrated comprising a plurality of walls 4 which are positioned in a desired arrangement. Each wall comprises a bottom panel 6, retention panel 8 located above bottom panel 6, and top panels 10 located above the retention panel 8. Section A illustrates an opening in which no top panels 10 are present and a retention panel 8 is supported by vertical aluminum extrusions 12. Of course the number of bottom panels 6 located below retention panel 8 and the number of top panels 10 located above retention panel 8 may vary depending on the desired appearance of the wall panel system and the wiring needs of the room. It is contemplated to use more than one retention panel 8 on a wall 4 to allow for an increased cable handling capacity.

One aspect of the present invention is shown in FIG. 2, wherein a section B of the wall panel system 2 of FIG. 1 is illustrated. Section B illustrates an opening in which no top panels 10 are present for illustrative purposes. Section B of FIG. 2 also has retention panel 8 removed so as to expose the inner parts of a raceway cable retention and accommodation apparatus denoted generally as 14. In the embodiment of FIG. 2, the raceway cable retention and accommodation apparatus comprises C-shaped brackets 16 which are attached or mounted to a support surface 18, wherein support surface 18 is located on a post 20 or a connection piece such as an adjustable expansion bar 22. Each end of the adjustable expansion bar 22 is attached to a post 20 by well known means such as nuts and bolts. In one embodiment, the expansion bar 22 comprises two pieces slidable with respect to each other so as to be adjustable in length. Such an expansion bar 22 can be adjusted to have lengths of 36", 42", or 48", but other lengths are also possible depending on the desired wall length. In another embodiment the connection piece may be fixed in length, but with variable lengths of bar 22 made available. Each of the brackets 16 have a mounting portion 24 allowing the brackets 16 to be attached to the adjustable expansion bar 22 or posts 20 by such well known mounting devices as nuts and bolts 26 and the like. Once the brackets 16 are attached to the expansion bar 22 and posts 20, cables 28 are strung through brackets 16 as seen in FIG. 3. A C-shaped retention panel 8 is then attached to the brackets 16 in a snap-on manner to produce the wall panel system of FIG. 1. Panel 8 has a flexible filler strip 30 attached to each end thereof. It is contemplated that the cable retention and accommodation apparatus is designed to be an integral component of existing wall panel systems, such as the Etho-Space wall panel system described in U.S. Pat. No. 5,038,539 assigned to Herman Miller, Inc. and manufactured and available from Milcare, Inc., a Herman Miller Company. It is further contemplated that the cable retention and accommodation apparatus is adapted to other configurations besides the straight line 180° passage of FIGS. 1–3, such as (1) inside 90° corners (See FIG. 4); (2) inside 135° corners; and (3) through T-connections required for panel support.

The wall panel system of FIG. 1 comprises a rectangular top panel 10 and a rectangular bottom panel 6 which are adjacent to retention panel 8. Top panel 10 and bottom panel 6 are aligned with each other and are parallel to and offset from surface 84 of retention panel 8 such that the thickness of panels 6 and 10 is different from retention panel 8. Furthermore, as shown in FIGS. 1, 6, 7C–E, and 9B, an appealing appearance is accomplished by having the edges 32 and 34 of panels 6 and 10, respectively, be parallel with and adjoining corresponding edges 36 and 38 of retention panel 8 formed between surfaces 80 and 82 and between surfaces 86 and 88, respectively.

Besides allowing for multiple walls 4 to be connected in a linear manner as shown in FIGS. 1–3, the cable retention and accommodation apparatus 16 allows for the walls 4 to be configured to form a corner 40 as shown in FIG. 4. Corner 40 is formed by two posts 20 in which their support surfaces 18 for brackets 16 are perpendicular with respect to each other. Each post 20 has a bracket 16 attached to the support surface 18 and where each bracket 16 has a corner retention panel 42 attached thereto in a snap-on fashion. Corner retention panels 42 have the same shape as the retention panels 8 of FIGS. 2 and 3 up to the brackets 16. However, the top surface 44 and the bottom surface (not shown) of each corner panel 42 have an extension 46 extending beyond the bracket 16. The other three surfaces of the corner panels 42 are mitred as shown in FIG. 4. The posts 20 are attached to each other by a curved piece 48 and by a draw tube assembly as described in U.S. Pat. No. 5,038,539. As seen in FIG. 4, once the two corner panels 42 are snapped into place they form an inner corner and, in addition, their flexible filler strips 30 overlap at 50. The panels 42 are mitred at the appropriate angle for producing either a 90° or 135° corner. A cable 28 is threaded through the brackets 16 and around the corner. Furthermore, rear panels 52 may be attached to the other sides of posts 20 and curved piece 48. Rear panels 52 comprise straight sections and a curved section. The curved section is adjacent to curved piece 48. Rear panels 52 have a C-shaped cross-section similar to panels 42, as shown in FIG. 6. The straight sections of rear panels 52 are attached by C-shaped brackets (not shown) attached to post 20 in a manner similar to that of the C-shaped brackets 16 which attached panels 42. The curved section of rear panels 52 is preferably attached to two C-shaped brackets attached to each end of curved section 48. Once the straight and curve sections of rear panels 52 are attached to the C-shaped brackets, flexible filler strips overlap. Thus, a cable retention panel system may be formed for outside corners as well as inside corners. Though the above example illustrates a 90° corner other configurations of the cable retention panel system are contemplated, such as a 135° corner.

FIG. 5A illustrates a first embodiment of the bracket 16 used in the wall panel system of FIGS. 1–4, 7A–E, 8A–B, 9A–B, 10A–B, and 11A–C. Bracket 16 is preferably made of 0.065 (16 gauge) sheet metal, but other materials having sufficient strength to support the retention panel and the cables. Bracket 16 comprises three elements, a mounting portion 24 and two J-shaped structures 54. J-shaped structures are preferably made of 0.033 spring steel. Mounting portion 24 preferably is rectangular and has a plurality of holes for mounting the bracket 16 to a support surface 18. Each J-shaped structure has four planar legs 56, 58, 60, and 62 connected to each other. Each J-shaped structure 54 has leg 56 placed parallel to and attached to the mounting portion 24 in a well known way such as spot welding to form a C-shaped bracket.

FIG. 5B illustrates a second embodiment of the bracket 16 which can also be used in the wall panel system of FIGS. 1–4, 7A–E, 8A–B, 9A–B, 10A–B, and 11A–C. The particulars of the second embodiment of the bracket 16 are the same as those for the first embodiment of FIG. 5A described above, however, the second embodiment employs a pivoting blocking element 64. Blocking element 64 retains wires in place so none fall out when panel 8 is not attached to the C-shaped bracket. Blocking element 64 is made of 0.047 steel. Blocking element 64 has a width of approximately 1.25" and a length of approximately 2.80". At a bottom end of blocking element 64 a tab 66 is formed which is parallel the remaining portion 68 of the blocking element 64. Tab 66 has a length of approximately 0.430" and is displaced from the plane of portion 68 by approximately 0.063". The top end of blocking element 64 has a radius of curvature of approximately 0.625" and a hole 70 which is aligned with a corresponding hole 72 in top leg 62. Hole 72 is located approximately 0.250" from the free end of leg 62. Blocking element 64 is pivotally attached to top leg 62 via rivet 74. The blocking element 64 is able to rotate from an open position exposing the gap between legs 62 to a closed position closing the same gap. In the open position, one is able to insert cables 28 through the C-brackets. In the closed position, the blocking element 64 is pivoted so that tab 66 fits behind bottom leg 62, thus, ensuring cables 28 are retained between the brackets 16 while retention panel 8 is snapped into place.

Mounting portion 24 may have several preferred embodiments. As shown in FIGS. 2, 3, 7A, and 8A, a first embodiment of the mounting portion 24 comprises a rectangular sheet, preferably made of 0.065 (16 gauge) sheet metal. In a preferred embodiment, the rectangular sheet has a width of approximately 2.0" and a length of approximately 6.375". Furthermore, the rectangular sheet has a plurality of holes and/or slots to have mounting devices 26 inserted therein. It is preferred that there are a pair of holes aligned with each other so as to be parallel to a length-wise edge of the rectangular sheet.

The pair of holes are separated by approximately 1.0" and are approximately 0.5" from the length-wise edge and each of the holes is 2.687" from a width-wise edge closest thereto. The pair of holes will be aligned with the opening of the C-shaped bracket 16. Furthermore, the mounting portion 24 comprises another pair of holes and a slot which are aligned with each other so as to be parallel to a second length-wise edge of the rectangular sheet. The pair of holes are separated by approximately 3.625" and are approximately 0.5" from the length-wise edge and each of the holes is 1.375" from a width-wise edge closest thereto. The slot is located between the second pair of holes and separated from each hole by approximately 1.75". The second pair of holes and the slot will be offset from the opening of the C-shaped bracket 16.

FIGS. 9A–B illustrate a second embodiment of the mounting portion 24 which is essentially the same rectangular sheet described previously for the first embodiment. The second embodiment differs from the first embodiment by having a L-shape in which the sheet is bent at a right angle approximately 0.75" from the length-wise edge closest the slot. Thus, an L-shaped mounting portion is formed having a length of approximately 6.375" and one rectangular section having a width of approximately 1.25" and another rectangular section perpendicular to the other section and having a width of approximately 0.75". The mounting portion 24 preferably has holes configured as in the first embodiment with the only variation being that the slot is eliminated. It is preferred that #10×¾" screws and 0.218" diameter holes and slots are used for mounting the bracket 16 in the various embodiments described above except for the embodiment of FIGS. 9A–B. In the embodiment of FIGS. 9A–B, #10-24 machine screws are used.

Once each J-shaped structure 54 is interconnected to the mounting portion 24 the configuration of the J-shaped structure 54 is easily described. The four legs of a J-shaped structure are mirror images of their respective legs on the other J-shaped structure with respect to a plane perpendicular to and bisecting the length of the mounting portion 24. Legs 58 form an angle of approximately 30° with respect to the plane. Legs 60 form an angle of approximately 45° with respect to the plane. Legs 62 are parallel to legs 56, the support surface 18 and the mounting portion 24.

In a preferred embodiment, the thickness and width for leg 56 is approximately 0.033" and 1.25", respectively. The thickness and width for legs 58, 60, and 62 is approximately 0.033" and 1.25", respectively. The length of each of legs 56 is approximately 2.0". The length of each of legs 58 is approximately 0.812". The length of each of legs 60 is approximately 1.562". The length of each of legs 62 is approximately 1.687" and the separation between the legs 62 is approximately 1.812". Though the above dimensions and angles are preferred it should be apparent that other dimensions and angles are contemplated depending on the desired appearance and cable capacity.

As shown in FIGS. 7A and B, bracket 16 may be attached to post 20 by inserting mounting devices 26, such as sheet metal screws, into holes present in the mounting portion 24 offset from the legs and which are aligned with corresponding holes in the post 20. In another embodiment, a bracket 16 may be attached to an expansion bar 22 as shown in FIGS. 8A and B. Screws are inserted into holes present in the mounting portion 24 aligned with the legs and which are aligned with corresponding holes in the expansion bar 22.

In yet another embodiment shown in FIGS. 9A–B, bracket 16 is attached to the vertical extrusions 12 of FIG. 1. Bracket 16 has an L-shaped mounting portion 24 which has a section perpendicular to legs 62. A preferred embodiment of the L-shaped mounting portion was described previously. The bracket 16 is preferably is attached to a rectangular section having a width of 1.25" such that the bracket 16 is in contact with the other perpendicular section. As seen in FIG. 12 vertical extrusions 12 define a cavity space wherein cover posts 20 are located. Vertical extrusions 12 have slots 75 in which rectangular nuts 76 are able to slide down into a mating position. The slots 75 face in a direction perpendicular to the side in which the covers 8 face. Nuts 76 may be formed as separate pieces or formed by two tapped holes in a single piece which slides in the slot. Machine screws 78 are inserted into holes present in the mounting portion 24 and tightened into rectangular nuts 76 which are aligned with the holes.

Once the C-shaped brackets 16 are attached to the support surfaces 18, one or more cables 28 are strung through the brackets 16 so as to be contained in each J-shaped structure and the C-shaped bracket. Then retention panel 8 engages legs 58, 60, and 62 so as to be attached to brackets 16 in a snap-on manner.

FIG. 6 illustrates a preferred embodiment of the retention panel 8. Retention panel has five planar and rectangular surfaces 80, 82, 84, 86, and 88 connected to each other. Surfaces 80 and 88 are mirror images of each other, as well as surfaces 82 and 86, with respect to a horizontal plane perpendicular to and bisecting along the length surface 84. Surface 80 is angled downward with respect to the horizontal plane and surface 88 is angled upward with respect to the horizontal plane so that each form an acute angle of approximately 30° with respect to the horizontal plane. Surfaces 82 and 86 each form an angle of approximately 45° with respect to the plane. Surfaces 80 and 82, as well as surfaces 86 and 88, subtend an angle of approximately 105°. Surface 84 is parallel to legs 56, the support surface 18 and the mounting portion 24 when attached to brackets 16 in a snap-on manner. Thus, retention panel 8 is preferably C-shaped.

In a preferred embodiment, the surfaces 80, 82, 84, 86, and 88 are made of approximately 0.100" extruded plastic having a desired color. The length of each of the surfaces varies depending on the desired length of the wall employing the panel. For the retention panel shown in FIG. 6, the width of rectangular surfaces 80 and 88 is approximately 0.5". The width of rectangular surfaces 82 and 86 is approximately 1.562". The width of rectangular surface 84 is approximately 5.188". Though the above dimensions and angles are preferred it should be apparent that other dimensions and angles are contemplated depending on the desired appearance and cable capacity.

Another preferred embodiment of retention panel 8 is illustrated in FIGS. 11A–C. The retention panel 8 of FIGS. 11A–C is preferably attached by the brackets 16 to the vertical extrusions 12 of FIG. 1. The second embodiment of retention panel 8 is exactly the same as the retention panel 8 described previously regarding FIGS. 2 and 6, except for a few differences. One difference is that surfaces 80 (not shown) and 88 contain notched out areas 90 and support areas 92. For retention panels having lengths of approximately 30" or 48", notched areas 90 have a length of approximately 3.25" and the length of the support area 92 is approximately 23.5" or approximately 41.5", respectively. The notched-areas 90 preferably have a width of approximately 0.5". As seen in FIGS. 11B–C, a support piece 94 is attached to a center section 90 located in the interior portion of the retention panel at surface 88 and approximately 1.75" from each end of the support area 92. Support piece 94 preferably is made of 18 gauge sheet metal and is L-shaped, wherein each leg of the L-shaped piece is approximately 0.5" wide and approximately 19" or approximately 37" long, respectively. The support piece is preferably attached to retention panel 8 by rivets 96 or other well known attachment devices.

As shown in FIGS. 10A–B, an end cap 98 is inserted to fit snugly in the open ends of retention panel 8 present at an end wall. Cap 98 presents an appealing appearance to the modular wall panel system and prevents access to the cables therein. Cap 98 preferably is made of 18 gauge steel. Cap 98 comprises in one embodiment a rectangular-like mounting section 100 with a length-wise edge connected to a second section 102. Section 100 preferably has a width of approximately 1.5" and a length of approximately 6.375". Section 100 has a length-wise edge unattached to section 102 that has three indentations 104, 106, and 108. Indentations 104 and 108 are located approximately 1.375" from each corresponding width-wise edge of section 8 and have a depth of approximately 0.266" and a radius of curvature of approximately 0.109". Indentation 106 is slot-like in shape having a width of approximately 0.125" and a radius of curvature for the inner corners of approximately 0.109". As seen in FIG. 10B, section 102 is a planar sheet having a shape approximately the same as the cross-sectional shape defined by retention panel 8 and brackets 16. Section 102 has a width of approximately 2.0" and a length of approximately 7.562" as measured from corners 104.

Preferably, cap 98 is placed into position after bracket 16 has been mounted. Indentations 104, 106, and 108 engage the sheet screws which are inserted into the offset pair of holes and slot of the mounting portion 24. Next the screws are tightened so as to hold the bracket 16 and cap 98 into place. Then retention panel 8 is snapped into place onto bracket 16 and section 102. Thus, the cable retention space is sealed off by section 102.

As shown in FIGS. 7C–E, when the retention panel 8 is snapped into place onto brackets 16 there is formed a cable retention space with improved cable capacity. In the embodiment of FIG. 7C, it is shown that the cable retention space created is capable of containing ten ¾" diameter flexible conduit cables. In the embodiment of FIG. 7D, it is shown that the same cable retention space of FIG. 7C is capable of containing sixteen ½" diameter flexible conduit cables. Furthermore, the embodiment of FIG. 7E, illustrates that when ½" diameter flexible cables are bundled together the cable retention space is cable of containing thirty ½" flexible conduit cables (3 bundles each containing 10 ½" cables) and five ¾" diameter flexible conduit cables.

While the invention has been described with relation to certain presently preferred embodiments, those with skill in this art will recognize other modifications of the invention which will still fall within the scope of the invention, as expressed in the accompanying claims.

We claim:

1. A panel system, comprising:

a cover extending along a first direction;

a first post;

a second post spaced from said first post;

a connection piece, wherein said connection piece is connected to said first post and said second post; and a C-shaped bracket, wherein said C-shaped bracket is mounted to said connection piece and said cover is attached to said C-shaped bracket, wherein said C-shaped bracket comprises a blocking element attached thereto and having a structure to pivot about an axis perpendicular to said attached cover so as to cover a gap defined by said C-shaped bracket.

2. The panel system of claim 1, wherein said cover is C-shaped.

3. The panel system of claim 1, wherein said cover is attached to said bracket in a snap-on manner.

4. The panel system of claim 1, comprising a panel extending along said first direction and connected to said first post and said second post.

5. The panel system of claim 4, wherein said cover juts beyond a plane defined by said panel.

6. The panel system of claim 1, comprising a pivoting element attached to said C-shaped bracket and said blocking element to enable said blocking element to pivot.

7. A panel for a panel system, comprising:

a first surface extending along a horizontal direction;

a second surface extending along said horizontal direction and connected to said first surface;

a third surface extending along said horizontal direction and connected to said second surface;

a fourth surface extending along said horizontal direction and connected to said third surface;

a fifth surface extending along said horizontal direction and connected to said fourth surface, wherein said first and second surfaces are mirror images of said fourth and fifth surfaces with respect to a plane which is perpendicular to said third surface; and wherein said first surface defines an acute angle of approximately 30° with respect to said plane.

8. The panel of claim 7, wherein said second surface defines an angle of approximately 45° with respect to said plane.

9. The panel of claim 7, wherein said first surface and said second surface subtend an angle of approximately 105°.

10. A panel system, comprising:

a first post;

a second post spaced from said first post;

a first panel attached to said first and second posts and having a planar face;

a second panel attached to said first and second posts and having a planar face, said planar faces of said first and second panels lying along a common plane; and a wire retention cover attached to said first and second posts so that said wire retention cover is positioned between and adjacent to said first and second panels, said wire retention cover jutting along a first direction from said common plane so as to define a space to provide increased capacity for containing wiring.

11. The panel system of claim 10, comprising a first C-shaped bracket to attach said cable retention cover to said first post, said first C-shaped bracket attached to said first post and having a gap offset from said common plane along said first direction; and a second C-shaped bracket to attach said wire retention cover to said second post, said second C-shaped bracket attached to said second post and having a gap offset from said common plane along said first direction.

12. A panel system, comprising:

a first post extending along a vertical direction;

a second post extending along said vertical direction and spaced from said first post;

a wire retention cover attached to said first and second posts;

a connection piece, wherein said connection piece is connected to said first post and said second post; and a C-shaped bracket defining a vertical gap, wherein said C-shaped bracket is mounted to said connection piece and said cable retention cover is attached to said C-shaped bracket so that the attached cover defines a space to provide increased capacity for containing wiring.

13. A panel system, comprising:

a cover extending along a first direction;

a first post; and a C-shaped bracket, wherein said C-shaped bracket is mounted to said first post and said cover is attached to said C-shaped bracket, wherein said C-shaped bracket comprises a blocking element attached thereto and having a structure to pivot about an axis perpendicular to said attached cover so as to cover a gap defined by said C-shaped bracket.

14. The panel system of claim 13, comprising:

a second post spaced from said first post; and a second C-shaped bracket, wherein said second C-shaped bracket is mounted to said second post and said cover is attached to said C-shaped bracket.

15. The panel system of claim 14, comprising a panel extending along said first direction and attached to said first post and said second post.

16. The panel system of claim 15, wherein said cover juts beyond a plane defined by said panel.

17. The panel system of claim 13, wherein said cover is C-shaped.

18. The panel system of claim 13, wherein said cover is attached to said bracket in a snap-on manner.

19. The panel system of claim 13, comprising a pivoting element attached to said C-shaped bracket and said blocking element to enable said blocking element to pivot.

20. A panel system, comprising:

a first post;

a first panel attached to said first post and having a planar face;

a second panel attached to said first post and having a planar face, said planar faces of said first and second panels lying along a common plane; and a wire retention cover attached to said first post so that said wire retention cover is positioned between and adjacent to said first and second panels, said wire retention cover jutting along a first direction from said common plane so as to define a space to provide increased capacity for wiring.

21. The panel system of claim 20, comprising a first C-shaped bracket to attach said cable retention cover to said first post, said first C-shaped bracket attached to said first post and having a gap offset from said common plane along said first direction.

22. A panel system, comprising:

a first post extending along a vertical direction;

a wire retention cover attached to said first post; and a C-shaped bracket defining a vertical gap, wherein said C-shaped bracket is mounted to said first post and said cover is attached to said C-shaped bracket so that the attached cover defines a space to provide increased capacity for containing wiring.

* * * * *

UNITED STATES PATENT AND TRADEMARK OFFICE
CERTIFICATE OF CORRECTION

PATENT NO. : 5,511,349
DATED : April 30, 1996
INVENTOR(S) : James O. Kelley et al.          Page 1 of 2

It is certified that error appears in the above-indentified patent and that said Letters Patent is hereby corrected as shown below:

On the Title Page: Item [56]

In column 1, under "References Cited U.S. PATENT DOCUMENTS", add the following:

| | | |
|---|---|---|
| --2,027,619 | 1/1936 | Rutherford |
| 3,405,488 | 10/1968 | Nelson |
| 3,464,177 | 9/1969 | Amato |
| 3,823,251 | 7/1974 | Heithecker et al. |
| 4,037,900 | 7/1977 | Schmidger |
| 4,156,795 | 5/1979 | Lacan |
| 4,216,823 | 8/1980 | Keldmann |
| 4,258,515 | 3/1981 | Owen |
| 4,534,147 | 8/1985 | Cristell |
| 4,563,542 | 1/1986 | Pollack |
| 4,589,449 | 5/1986 | Bramwell |
| 4,631,881 | 12/1986 | Charman |
| 4,713,918 | 12/1987 | Cioffi |
| 4,720,953 | 1/1988 | Onishi et al. |
| 4,723,580 | 2/1988 | Trautwein |
| 4,874,322 | 10/1989 | Dola et al. |
| 4,918,886 | 4/1990 | Benoit et al. |
| 4,999,961 | 3/1991 | McNary |
| 5,024,614 | 6/1991 | Dola et al. |
| 5,038,539 | 8/1991 | Kelley et al. |
| 5,065,556 | 11/1991 | DeLong et al. |
| 5,091,607 | 2/1992 | Stob |
| 5,214,890 | 6/1993 | Levitan et al.--. |

UNITED STATES PATENT AND TRADEMARK OFFICE
CERTIFICATE OF CORRECTION

PATENT NO. : 5,511,349
DATED : April 30, 1996
INVENTOR(S) : James O. Kelley et al.          Page 2 of 2

It is certified that error appears in the above-indentified patent and that said Letters Patent is hereby corrected as shown below:

Under "References Cited", after the section entitled "U.S. PATENT DOCUMENTS", add the following:

--FOREIGN PATENT DOCUMENTS 2,414,807    8/1979    France .
  2,159,850   12/1985    U.K. .

Signed and Sealed this

Nineteenth Day of August, 1997

Attest:

BRUCE LEHMAN

*Attesting Officer*                *Commissioner of Patents and Trademarks*